(12) United States Patent
DeSalle

(10) Patent No.: US 9,269,246 B2
(45) Date of Patent: Feb. 23, 2016

(54) COPPER THEFT ALARM FOR GRAIN BIN SYSTEMS

(71) Applicant: Net Irrigate, LLC, Bloomington, IN (US)

(72) Inventor: Edward DeSalle, Bloomington, IN (US)

(73) Assignee: Net Irrigate, LLC, Bloomington, IN (US)

(*) Notice: Subject to any disclaimer, the term of this patent is extended or adjusted under 35 U.S.C. 154(b) by 136 days.

(21) Appl. No.: 14/319,190

(22) Filed: Jun. 30, 2014

(65) Prior Publication Data

US 2015/0379837 A1  Dec. 31, 2015

(51) Int. Cl.
| | | |
|---|---|---|
| G08B 13/14 | (2006.01) | |
| G08B 13/12 | (2006.01) | |
| H02B 1/00 | (2006.01) | |
| H01R 9/00 | (2006.01) | |
| H02B 1/04 | (2006.01) | |
| H01B 7/00 | (2006.01) | |
| H01B 11/02 | (2006.01) | |
| H02G 15/22 | (2006.01) | |
| H01B 11/06 | (2006.01) | |
| G08B 13/22 | (2006.01) | |

(52) U.S. Cl.
CPC .................................... *G08B 13/22* (2013.01)

(58) Field of Classification Search
None
See application file for complete search history.

(56) References Cited

U.S. PATENT DOCUMENTS

| 4,301,399 A * | 11/1981 | Miller ............... G01R 31/1272 |
| | | 324/541 |
| 4,945,341 A * | 7/1990 | Buttimer ............ G08B 13/1409 |
| | | 340/539.1 |
| 6,459,374 B1 | 10/2002 | Rand et al. |
| 6,462,668 B1 | 10/2002 | Foseide |
| 7,880,612 B2 | 2/2011 | Caswell |
| 8,378,822 B2 | 2/2013 | Price et al. |
| 2009/0289784 A1 | 11/2009 | Sid |
| 2010/0085189 A1 | 4/2010 | Caswell |
| 2010/0141424 A1 | 6/2010 | Coloma Calahorra et al. |
| 2010/0328072 A1* | 12/2010 | Price ................... G08B 13/1409 |
| | | 340/568.3 |
| 2012/0105230 A1* | 5/2012 | Bockstoce ........... G08B 25/045 |
| | | 340/568.2 |
| 2012/0171987 A1 | 7/2012 | Newman |
| 2014/0375304 A1* | 12/2014 | Holce .................. G01R 31/343 |
| | | 324/127 |

* cited by examiner

*Primary Examiner* — Jennifer Mehmood
*Assistant Examiner* — Pameshanand Mahase
(74) *Attorney, Agent, or Firm* — Woodard, Emhardt, Moriarty, McNett & Henry LLP

(57) ABSTRACT

A copper theft alarm system is disclosed. The alarm system can be deployed on existing grain bins or other electrically powered equipment, allowing persons to receive an automated phone call, text message notification, or other desired notification when the system has sensed that a copper cable is being pulled out of a conduit. The notification can aid in potentially disrupting a thief's activity.

17 Claims, 4 Drawing Sheets

COPPER THEFT ALARM FOR GRAIN BIN SYSTEMS

BACKGROUND

The present invention relates to an alarm for a grain bin system or other electrical equipment. More specifically the invention relates to an improved alarm system that senses when a cable supplying power or control to a grain bin or associated equipment has been removed or tampered with and triggers an alarm or notification to a remote user.

Grain storage facilities are commonplace wherever crops are produced in the United States and abroad. These facilities typically include one or more storage buildings, often referred to as "grain bins," in addition to equipment for handling and maintaining the stored grain, such as ventilation fans, heaters, pumps and the like. In order to power the equipment, large diameter cables (typically made from copper) are run from each piece of equipment to an electrical panel located at the facility. The cables are often run in underground conduits for ease of installation and increased safety.

With the rising price of copper, theft of these power cables is becoming a more prevalent problem worldwide. Since a typical grain bin system includes multiple long cable runs, each comprising heavy gauge copper wire conductors, their value on the scrap market makes them an attractive target for burglars. Additionally, because grain bins are typically located in rural areas, theft can take place out in the open with little probability anyone will ever witness the crime. Replacement costs for burglarized cables can reach into the thousands or tens of thousands of dollars including labor.

The steps required to steal a cable from a grain bin can be quite time consuming. First, the electrical panel must be opened to de-energize the cables. Then the ends of the cable must be disconnected from their termination points. Once the ends are free, the thieves will often pull the cable out of the conduit using a chain or rope tied to a vehicle, as substantial pulling force is often required. Since separate conduits are normally run to each piece of powered equipment, the process must be repeated multiple times to steal all of the cables at the facility. What is needed is a system for notifying a remote user or otherwise triggering a notification when a burglar has initiated the process so that he/she may be deterred and/or caught before all of the cables have been removed.

Prior attempts to address grain bin cable theft have suffered from significant drawbacks. For example, surveillance cameras have been used to monitor the areas around the grain bin. However, would require prohibitively expensive constant monitoring by personnel to detect when thieves are present. Other devices require a dedicated external source to power the alarm, which increases cost and allows thieves to disable the alarm by disconnecting the external power source. The present invention seeks to address at least these problems in addition to others.

SUMMARY OF THE INVENTION

The present disclosure relates to one or more of the following features, elements or combinations thereof. A cable alarm system is disclosed. The cable alarm system can be deployed on new or existing grain bin systems or other electrically powered equipment.

In the illustrative embodiment, a device is deployed at the grain bin which enables persons to receive an automated phone call, text message notification, or other desired notification when the system senses that a power cable supplying power to the grain bin is being pulled out of a conduit. The device and generated notification can aid in discouraging and/or disrupting the thief's activity while potentially allowing for intercepting the valuable copper power cable.

Additional features of the disclosure will become apparent to those skilled in the art upon consideration of the following detailed description of preferred embodiments exemplifying the best mode of carrying out the invention as presently perceived.

DESCRIPTION OF THE SPECIFIC EMBODIMENTS

Figure 1:
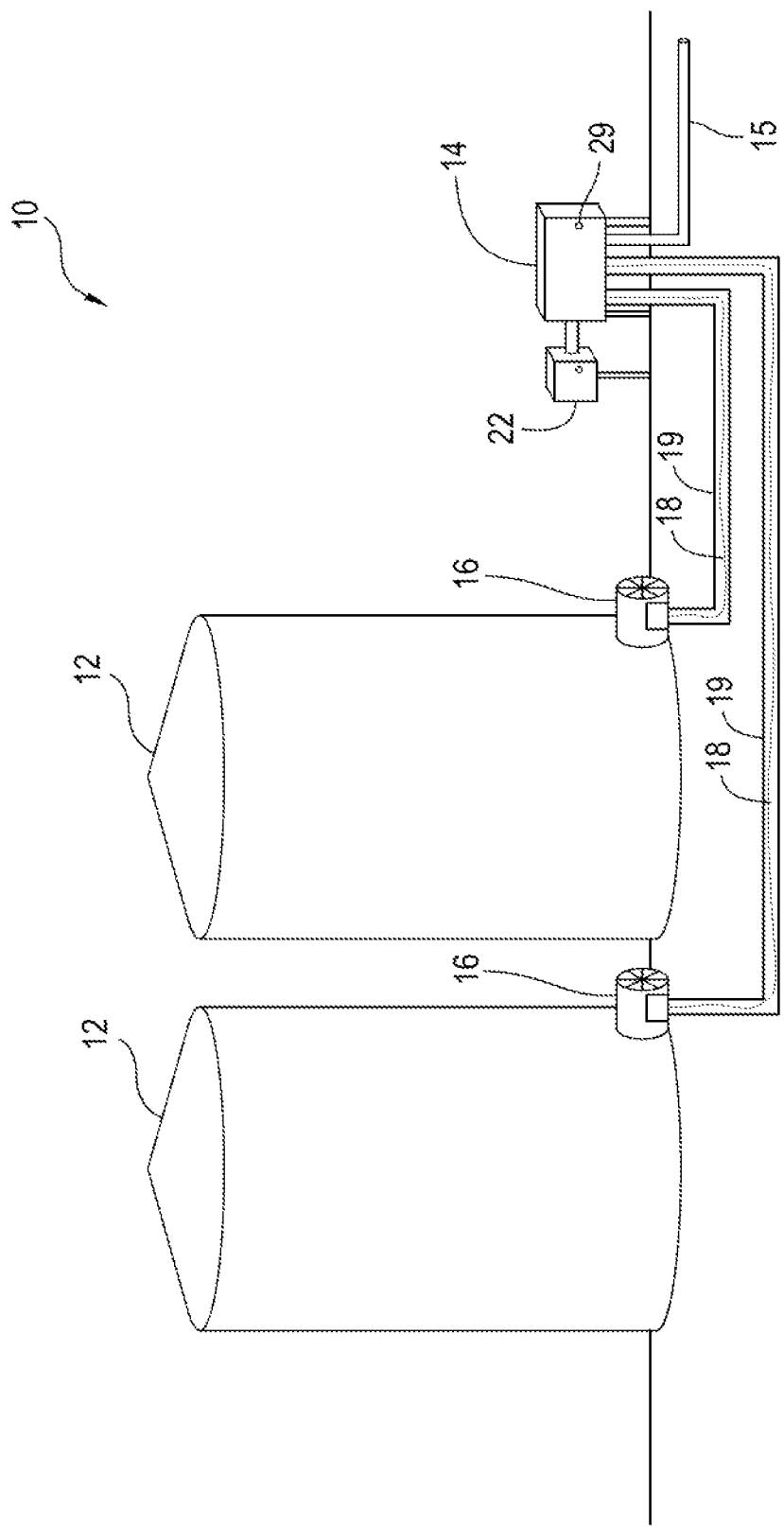
FIG. 1 is an overview of a grain bin system according to one embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Disclosed is an alarm for a grain bin system or other electrically powered equipment. The device operates in connection to a grain bin system to detect an attempted theft and, as a result, provides a notification to a designated user. In one form, the device is capable of providing this notification in the form of a phone call (such as to a predetermined number), a text message (SMS or the like), an e-mail, a data packet (such as at least one UDP datagram or TCP packet), or some other suitable method of notification.

Turning to FIG. 1, a perspective view of a grain bin system 10 according to one embodiment of the present disclosure is shown. As shown in FIG. 1, an exemplary grain bin system 10 includes one or more storage bins 12 with various associated equipment, such as ventilation fans 16, connected thereto. Other equipment for moving or maintaining grain may be provided with the grain bin system 10 including pumps, heaters, augers, conveyors, and the like. Electrical panel 14 provides power from an external source 15 to the equipment via cables 18 which are installed in conduits 19. Electrical panel 14 may also control, for example, a number of aspects of grain bin system 10, including the activation and speed of the fans 16 and the operation of other drying or loading/unloading equipment associated with the bins 12.

Cables 18, depending on the types of equipment being controlled or supplied, are often composed of multi-conductor cables, including copper, protected by an outer weatherproof and shielded housing. Due to their size and quantity, cables 18 are viewed by would-be burglars interested in vandalizing and removing them as a significant source of copper wire which can be sold for a significant sum of money as scrap metal.

Figure 2:
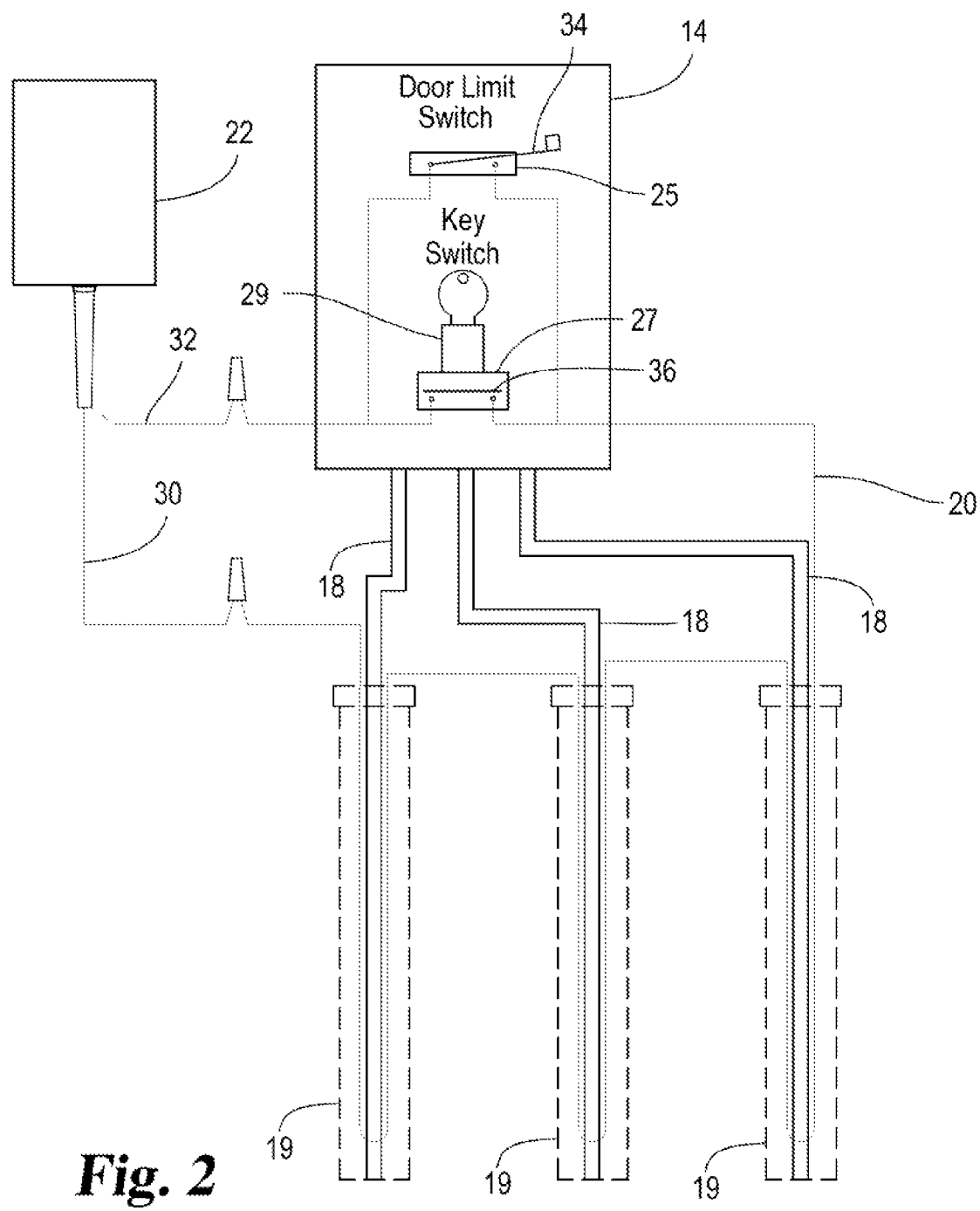
FIG. 2 is a diagrammatic view of a cable theft alarm according to one embodiment which is suitable for installation with a grain bin system, such as that of FIG. 1.

Turning to FIG. 2, with continued reference to FIG. 1, according to one embodiment of the present disclosure, a telemetry box 22 is provided for use with grain bin system 10. Telemetry box 22 may provide for monitoring of the details, such as air flow, temperature, humidity, equipment position or state, etc., or to report when the grain bin or associated equipment fails. Telemetry box 22 and/or control panel 14 may also include communication equipment suitable for providing remote access, monitoring, and/or control of grain bin system 10. Telemetry box 22 may be mounted, for example, adjacent or near the electrical panel 14, as shown in FIG. 1.

Telemetry box 22 may include or be coupled to alarm circuit 24, as shown herein, such that it monitors the electrical continuity of a conductive sensing loop 20. Telemetry box 22 also preferably provides a weatherproof environment for alarm circuit 24. In one form, the sensing loop 20 is inserted into the conduits 19 in a serial fashion as shown, with the ends 30 and 32 of the loop 20 connected to the alarm circuit 24. The conductors of the sensing loop 20 are preferably insulated and sized to be smaller than the cables 18 in order to allow fitment into the conduits 19 with the larger cable 18 being protected. For example, the cable(s) of the sensing loop 20 may be 10, 12, 14, 16, 18, 20 or 22 gauge wire. In one form, portions of the sensing loop are formed by running two conductors through the entire length of one of the conduits 19 alongside the power cable 18 and connecting first ends of the conductors at an end of the conduit. The other ends of the conductors are then serially connected to the sensing loop 20 or directly to the alarm circuit 24. In another form, portions of the sensing loop may be partially inserted into the conduits 19 up to a length needed to facilitate breakage of the loop when cable 18 is pulled out of the conduit.

Due to the tight clearance typically found between the cables 18 and the inner walls of the conduits 19, if a burglar attempts to pull any one of the cables 18 from a conduit 19, the resulting force will break the corresponding portion of the sensing loop 20, causing an open circuit condition. This will activate radio transmitter 26 to deliver a notification of a selected type to a pre-determined user and/or destination.

Alarm circuit 24 is preferably programmed such that after a successful notification(s) has been delivered by radio transmitter 26, the radio transmitter 26 is automatically deactivated. Furthermore, when cable 18 and sensing loop 20 are repaired, replaced, or otherwise restored, and subsequently re-connected, alarm circuit 24 automatically arms and continues monitoring the continuity of sensing loop 20.

Electrical panel 14 may optionally include a door sensor 25 which indicates whether a door of the panel 14 is open or closed. According to one form, the door sensor comprises a limit switch having a contact 34 that is closed when the panel door is closed and open when the panel door is open. The sensing loop 20 is connected through the door sensor 25 as shown, such that the continuity of the sensing loop 20 is maintained when the panel 14 is closed. However, when the panel 14 is opened, the continuity of sensing loop 20 will be interrupted.

In order to prevent false alarm notifications from being sent when the panel 14 is opened for service or other authorized activity, a key sensor 27 may be optionally provided. The key sensor 27 preferably comprises a contact 36 which is operatively connected to the panel key lock 29 and wired in parallel with the door sensor 25 as shown. When a key is properly inserted into the lock, the contact 36 will close, thereby maintaining continuity in the sensing loop 20 when the panel 14 is opened for service. However, if the panel 14 is opened without the using the key (such as during an attempted theft), both of the contacts 34 and 36 will be open, which will interrupt the continuity of the sensing loop 20 and trigger an alarm notification. Since thieves will typically break open electrical panels to disconnect power to the target cables before beginning the removal process, this provides an early warning to the property owner and/or law enforcement that an attempted theft is about to take place.

According to one form radio transmitter 26 (or 126 as described later) is a cellular communication device, such as a cellular radio, operating on a known cellular network, such as the GSM, LTE or CDMA wireless networks operated by AT&T or Verizon Wireless, or the like. It shall be appreciated that the cellular communication device may be programmed to transmit a notification signal in either a voice or data format depending upon user preference or any other factor.

It shall be appreciated that one or more of the components of alarm circuit 24 may be included as a portion of a printed circuit board serving a separate or related purpose within telemetry box 22. Alternatively, telemetry box 22 may be dedicated specifically to alarm circuit 24.

According to the embodiment illustrated in FIG. 2, alarm circuit 24 is powered by an internal battery 28. Suitable batteries for use as internal battery 28 are one or more XL-050F ½ AA 3.6V Lithium batteries sold by Xeno Energy USA located in Watertown, Conn. In a further form, the alarm circuit 24 operates automatically whenever grain bin system 10 is not operating (e.g., when fan 16 is turned off). Operation of the grain bin system is detected by a voltage within cable 18 or the like. Preferably, battery 28 is of sufficient capacity to supply power to the alarm circuit 24 for five years or more under constant monitoring use without requiring replacement. Additionally, battery 28 is preferably on-board in that it is housed within, on, or proximate to telemetry box 22, which contains alarm circuit 24.

During installation, conductors 30 and 32, which form portions of sensing loop 20, are connected to terminals on the alarm circuit 24, which may also be terminals of telemetry box 22. Given the above described connection, in the event a cable 18 is pulled from its conduit (thereby breaking a conductor in the sensing loop 20) or electrical panel 14 is opened without the key, electrical continuity through the sensing loop 20 will be lost. This triggers alarm circuit 24 to turn on radio transmitter 26 and relay the predetermined theft notifications. Below, a description of how this condition is detected and handled by alarm circuit 24 will be described in more detail.

Alarm circuit 24 is designed to handle two states: "Alarm ON and ARMED" and "Alarm ON and TRIGGERED". According to this embodiment, battery 28 is comprised of four (4) 3.6 volt lithium batteries connected in series to supply positive (+) 13.8 volts through diode 40 to alarm circuit 24. When the alarm switch 42 is closed, current flows through resistor 44 and charges capacitor 46. Current also flows through resistors 48 and 50 out into conductor 30, which is connected to terminal 52. If the conductivity path in the sensing loop 20 is unbroken the current returns to the GND terminal screw 54 on the alarm circuit 24 (which may also be connected to an external connection of telemetry box 22). Resistor 56 completes the circuit back to the negative side of battery 28. In the illustrated form, the ratio of resistor 48 (4.7 megohm) to that of resistor 50 and resistor 56 is 42:1. Thus, when sensing loop 20 is unbroken, the base of transistor 60 is held low, such that transistor 60 is not conducting and no current flows from collector to emitter under normal circumstances.

When the illustrative alarm circuit 24 is armed, silicon controlled rectifier (SCR) 62 is not conducting. The optocoupler IC3 64 is also not conducting in this state. Resistor 66 holds the base of transistor 68 low. Again, in the ARMED state transistor 68 is not conducting and no current flows from collector to emitter, and as such radio transmitter 26 is off.

Alarm circuit 24 transitions from the ARMED to the TRIGGERED state when the circuit connection between conductor 30 and conductor 32 is opened (i.e. when sensing loop 20 is broken due to removal of a cable 18 or the electrical panel 14 is opened without the key). As a result, the voltage at the base of transistor 60 rises. Accordingly, transistor 60 turns on and saturates. Capacitor 46 discharges through transistor 60 and resistor 70. A voltage appears at the gate of SCR 62. This voltage is sufficient to trigger the SCR 62 into conduction. As a result, current flows from battery 28 through resistor 72 and through anode to the cathode of SCR 62. The current through SCR 62 is sufficient to latch the SCR into conduction. The voltage at the base of transistor 68 rises to approximately ⅔ of the supply voltage due to the resistance ratio between resistors 66 and 72 causing transistor 68 to turn on. Transistor 68 begins conducting from collector to emitter which turns on radio transmitter 26. Radio transmitted 26 is configured to transmit a notification to a predetermined user/destination via a selected format upon activation.

After the notification has been transmitted by radio transmitter 26, software commands within the radio transmitter turn on transistor 74 (GPIO-3). This enables current to flow from the battery 28 through resistor 76 and through the input side (LED) of optocoupler IC3 64. This causes the phototransistor output of IC3 64 to turn on and current to flow from collector to emitter. The output current of IC3 64 shunts out the anode and cathode of SCR 62. The current through SCR 62 falls below the holding current and SCR 62 turns off. The current flowing through IC3 64 maintains the voltage at the base of transistor 68 and IC3 64 continues to hold transistor 68 on.

After 3 seconds transistor 74 (GPIO-3) turns off. IC3 64 resultantly turns off. Resistor 66 pulls the base of transistor 68 low. Transistor 68 turns off which turns off the radio transmitter 26. After the triggering of an alarm, alarm circuit 24 remains in the TRIGGERED state until the sensing loop 20 is repaired and continuity is re-established between conductor 30 and conductor 32, at which point the circuit automatically resets to the ARMED state.

Capacitor 78 is used to slow the rise of voltage at the base of transistor 60. This reduces the possibility of false triggering from transient voltages on the sensing loop conductors. Metal oxide varistor 80 and resistors 50 and 56 protect the alarm circuit from lightning and other transient voltages that may develop in the sensing loop 20.

Figure 3:
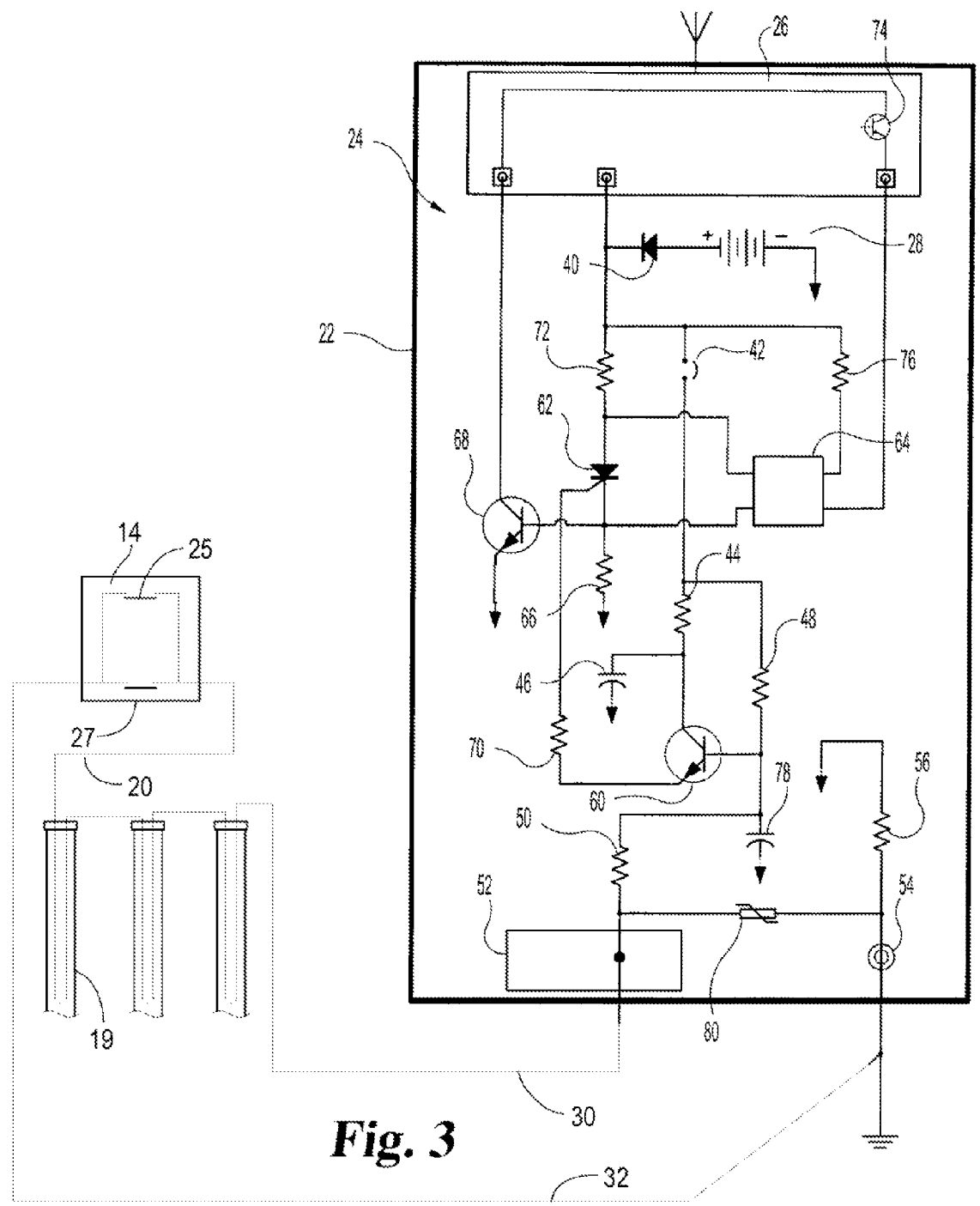
FIG. 3 is a circuit diagram of an illustrative control circuit for a cable theft alarm according to one embodiment which is suitable for installation in a grain bin system, such as that shown in FIG. 1.
Figure 4:
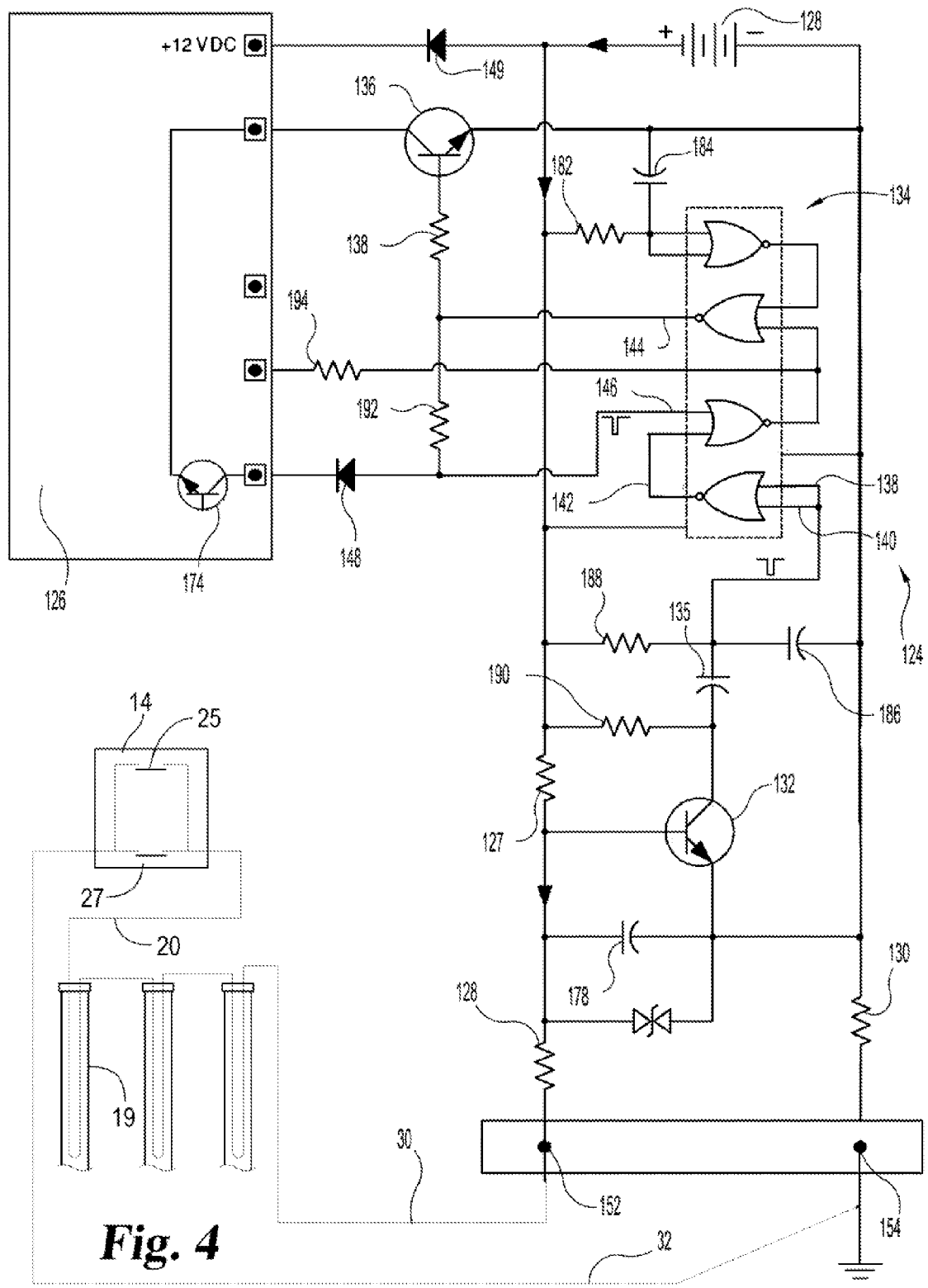
FIG. 4 is another circuit diagram of a second illustrative control circuit for a cable theft alarm according to another embodiment which is similarly suitable for installation in a grain bin system, such as that shown in FIG. 1.

Turning to FIG. 3, with continued reference to FIG. 1, according to another embodiment of the present invention, alarm circuit 124 may be used in conjunction with telemetry box 22 and the other components of FIG. 1 as described above with respect to alarm circuit 24. It shall be appreciated that one or more of the components of alarm circuit 124 may be included on a portion of a printed circuit board within telemetry box 22, or alarm circuit 124 may be contained within telemetry box 22 as a stand alone board. According to the embodiment illustrated in FIG. 3, alarm circuit 124 is powered by an internal battery 128. In a further form, the alarm circuit 124 operates automatically whenever grain bin system 10 is not operating (e.g., fans 16 or other equipment are not running) Preferably, battery 128 is of sufficient capacity to supply power to the alarm circuit 124 for five years or more without requiring replacement. Additionally, battery 28 is preferably on-board in that it is housed within or proximate to telemetry box 22.

During installation, conductor 30, which forms a connection point to sensing loop 20, is connected to a terminal 152 on the alarm circuit 124 of telemetry box 22. A grounding screw inside telemetry box 22 physically connects the circuit board GND terminal 154 to a metal structure of grain bin system 10 or other suitable ground. Conductor 32, which forms a return path from sensing loop 20, is also connected to the GND terminal 153. The sensing loop 20 (via conductors 30, 32, and other conductors in the sensing loop 20) completes the external circuit for alarm circuit 124.

Given the above described connection, in the event a cable 18 is pulled from its conduit (thereby breaking a conductor in the sensing loop 20) or electrical panel 14 is opened without the key, electrical continuity through the sensing loop 20 will be lost. This triggers alarm circuit 124 to turn on radio transmitter 126 and relay theft notifications. Below, a description of this condition is detected and handled by alarm circuit 124 will be described in more detail.

Alarm circuit 124 is designed to handle two states: "Alarm ON and ARMED" and "Alarm ON and TRIGGERED". According to this embodiment, battery 128 is comprised of four (4) 3.6 volt lithium batteries connected in series to supply positive (+) 13.8 volts to alarm circuit 124. Current flows through resistors 127 and 128 and out into the conductor 30 of sensing loop 20 via terminal 152. If the conductivity path in the sensing loop 20 is unbroken the current returns to the GND terminal 154. Once received at the GND terminal 154, the circuit is completed via resistor 130 to the negative side of battery 128. In the illustrated form, the ratio of resistor 127 (1 megohm) to that of resistor 128 (15 kilohm) and resistor 130 (15 kilohm) is 33:1. This holds the base of transistor 132 low. Thus, in this state, transistor 132 is not conducting and no current flows from collector to emitter under normal circumstances.

Furthermore, when the alarm circuit 124 is in the Alarm ON and ARMED state, capacitor 135 has equal potential (13.8 v) on both plates. As a result, the output of IC 134 is held low and resultantly, the base of transistor 136 is held low through resistor 138. In this state, transistor 136 will not conduct and therefore, radio transmitter 126 is powered off.

Alarm Circuit 124 is triggered when the circuit connection between conductor 30 and conductor 32 is opened (i.e. when sensing loop 20 is broken due to removal of a cable 18 or the electrical panel 14 is opened without the key). As a result, the voltage at the base of transistor 132 rises. Accordingly, transistor 132 turns on and saturates. One plate of capacitor 135 is pulled low through transistor 132. Resultantly, a negative pulse appears at input pins 138 and 140 of IC 134. This causes a positive pulse at output 142 of IC 134, given its NOR logic. The flip-flop circuit of IC 134 is activated and output pin 144 goes high. As a result, the base of transistor 136 is pulled high and causes transistor 136 to turn on. Transistor 136 begins conducting from collector to emitter and turns on radio transmitter 126.

After a preselected message has been transmitted by radio transmitter 26, software commands within the radio transmitter turn on transistor 174 (OUT 1). Pin 146 is pulled low through diode 148. This deactivates the flip-flop circuit in IC 134 and pin 144 resultantly goes low. Accordingly, the base of transistor 136 goes low and transistor 136 stops conducting, thereby turning off radio transmitter 126. The alarm circuit remains in this state until the sensing loop 20 is repaired and continuity is re-established between conductor 30 and conductor 32. When the continuity of sensing loop 20 is re-established, the alarm circuit automatically re-arms.

Capacitor 178 is used to slow the rise of voltage at the base of transistor 132. This reduces the possibility of false triggering from transient voltages in the sensing loop 20 by introducing a short time delay, such as 1-2 seconds, before triggering. The TVS diode 180 protects the alarm circuit from lightning and other transient voltages that may develop in the sensing loop 20. These transients can occur when electrical components in the grain bin system fail.

Resistor 182 and capacitor 184 are used to soft-start the circuit and prevent false alarms when the battery 128 is first installed or replaced. Capacitor 186 prevents EMI and RFI signals from triggering the device. Resistors 188 and 190 maintain an equal charge on the plates of capacitor 135 when the alarm circuit 124 is armed. Resistors 192 and 194 limit the current into the radio transmitter 126, while diodes 148 and 149 provide reverse polarity protection for radio transmitter 126.

The disclosed circuit design allows for universal compatibility with all brands of grain bin systems and equipment. It is independent of the conductors that supply power to the grain bin and works seamlessly with normal operation of the associated equipment. In the illustrated embodiment, the disclosed circuit design draws only 0.000035 Amperes (35 micro-amperes) utilizing a potential of 13.8 DC volts, allowing battery-life to last at least 3 years without recharge or replacement. Preferably, other designs would draw less than 100 micro-amperes when in the armed state (i.e. not during a triggered state when the radio transmitter is in operation.) Other alarm solutions utilize higher voltage solutions which require additional external batteries, solar panels, generators, or utility power to maintain current within the sensing loop conductors. Such designs pose reliability and safety risks, as well as introducing inefficient energy consumption. The disclosed circuit design manages power more efficiently and eliminates the needs for external power supplies which can deter from the reliability of the alarm system. For example, several consecutive cloudy days can cause a solar powered system to lose its charge, thereby generating a false alert or render the alarm system ineffective.

The disclosed system may also be used to prevent copper cable theft for other types of electrically powered equipment located in remote areas, such as agricultural well pumps, construction trailers, or backup generator installations.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

A plurality of advantages arises from the various features of the present disclosure. It will be noted that alternative embodiments of various components of the disclosure may not include all of the features described yet still benefit from at least some of the advantages of such features. Those of ordinary skill in the art may readily devise their own implementations of an alarm system that incorporate one or more of the features of the present disclosure and fall within the spirit and scope of the disclosure.

What is claimed is:

1. An anti-theft system for an electric power cable comprising:
   a radio transmitter for generating a notification to a predetermined recipient; and
   a conductive sensing loop having first and second ends, said sensing loop installed in at least one conduit with the power cable, wherein at least one portion of the sensing loop is formed by running two conductors through a conduit alongside the power cable and connecting first ends of the conductors at a first end of the conduit;
   an alarm circuit coupled to said radio transmitter, said alarm circuit comprising:
      a first circuit for supplying a continuous voltage to said first end of said conductive sensing loop; and
      a second circuit for detecting said continuous voltage at said second end of said conductive sensing loop and triggering said notification by providing power to said radio transmitter when said continuous voltage is disrupted.

2. The anti-theft system of claim 1, wherein the conductive sensing loop comprises an electrical conductor sized to facilitate breakage of the conductor when the power cable is pulled out of the conduit.

3. The anti-theft system of claim 1, wherein the conductive sensing loop comprises an electrical conductor having a smaller diameter than said electric power cable.

4. The anti-theft system of claim 1, wherein the conductive sensing loop comprises a plurality of conductor segments connected in series, said conductor segments forming an electrically continuous path between said first and second ends.

5. The anti-theft device of claim 1, wherein said conductive sensing loop is installed in a plurality of conduits containing power cables.

6. The anti-theft system of claim 1, further comprising:
   an on-board battery, the battery supplying at least a portion of said continuous voltage.

7. The anti-theft device of claim 1, wherein no external power source is used in providing said continuous voltage.

8. The anti-theft system of claim 1, further comprising a door sensor wired serially within said sensing loop, said door sensor configured to disrupt said continuous voltage when a door of an access panel associated with the power cable is opened.

9. The anti-theft system of claim 8, wherein said door sensor comprises a limit switch.

10. The anti-theft system of claim 8, further comprising a key sensor wired in parallel with the door sensor, the key sensor configured to maintain said continuous voltage when the door is opened using a key.

11. The anti-theft device of claim 1, wherein said radio transmitter is a cellular radio.

12. The anti-theft device of claim 11, wherein said notification is a telephone call.

13. The anti-theft device of claim 11, wherein said notification is a text message.

14. The anti-theft device of claim 1, wherein said power cable is connected to a grain bin system.

15. The anti-theft device of claim 14, wherein said power cable is connected to a fan motor of the grain bin system.

16. The anti-theft system of claim 1, wherein said power cable is connected to a water well pump.

17. A method for detecting an attempted theft of at least one electric power cable, comprising:
   installing a conductive sensing loop into a plurality of conduits containing power cables such that the conductive sensing loop will be broken when any one of the power cables is pulled out of the conduit, wherein at least one portion of the sensing loop is formed by running two conductors through the plurality of conduits alongside the power cables and connecting first ends of the conductors at a first end of one of the plurality of conduits;

connecting a first and second end of the sensing loop to an alarm circuit;

supplying a continuous voltage from the alarm circuit to the first end of the sensing loop;

detecting that the continuous voltage is not present at the second end of the sensing loop; and triggering a notification, based on said detecting, to a predetermined recipient by providing power to a radio transmitter connected to the alarm circuit.

* * * * *